United States Patent Office 2,972,489
Patented Feb. 21, 1961

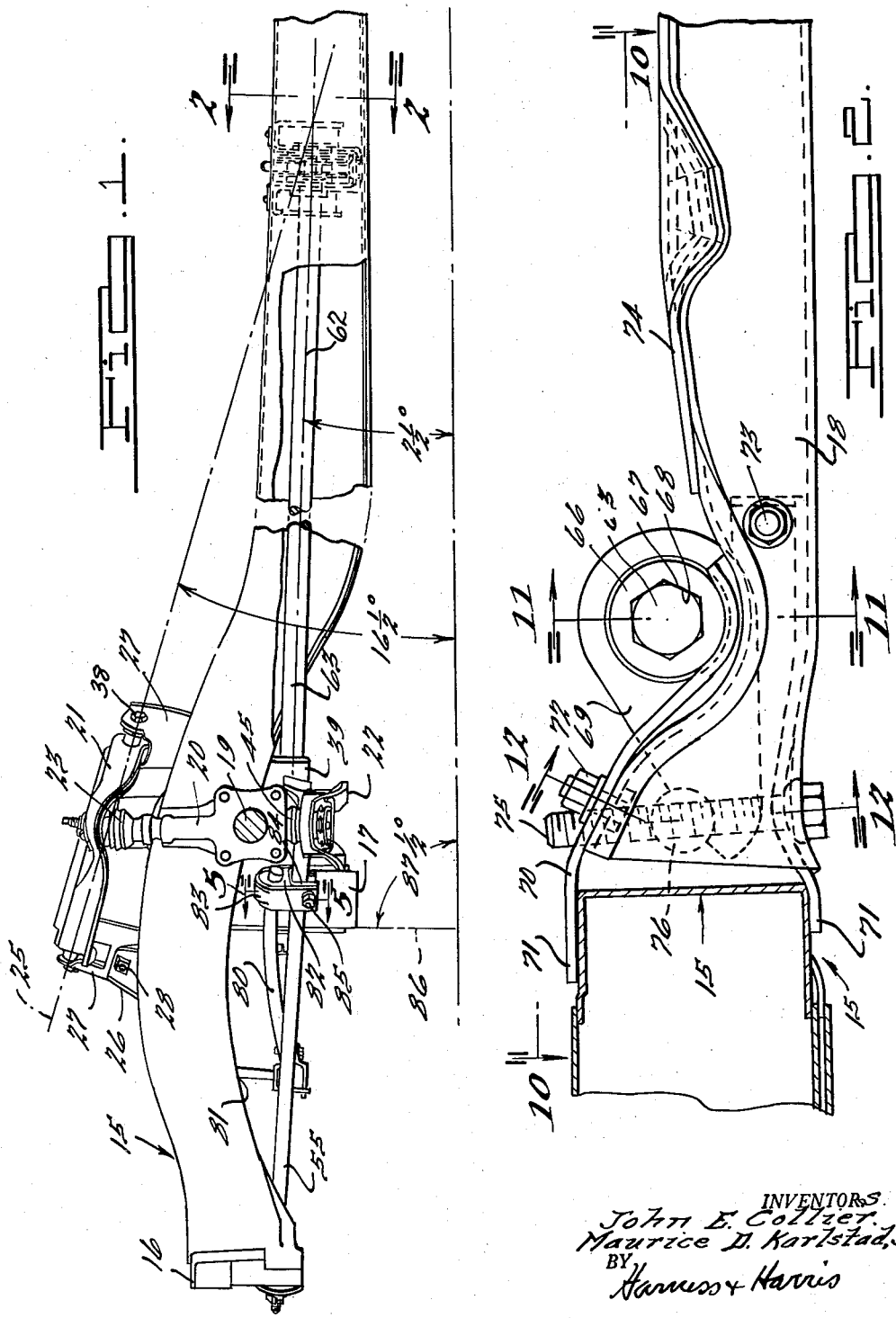

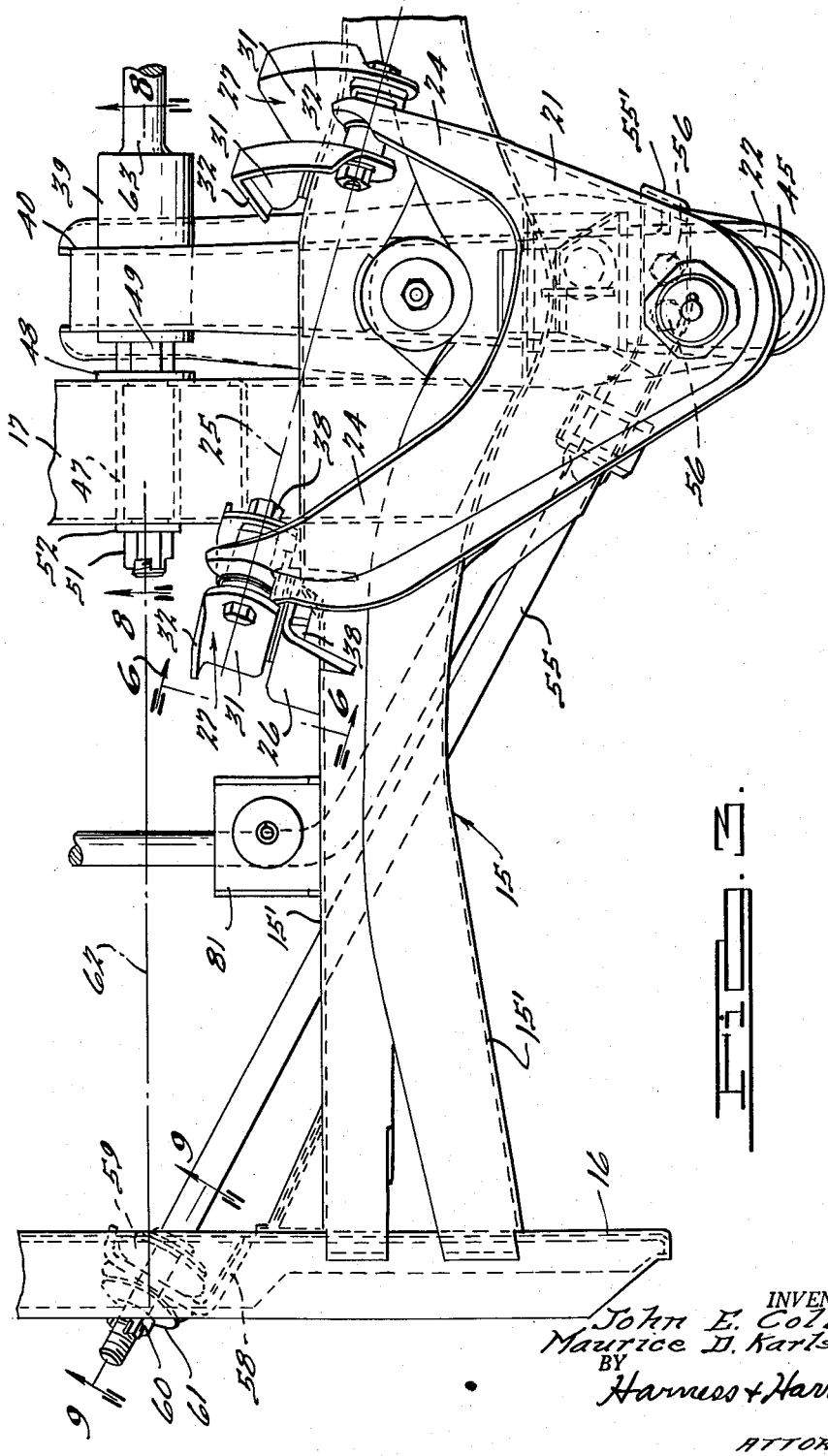

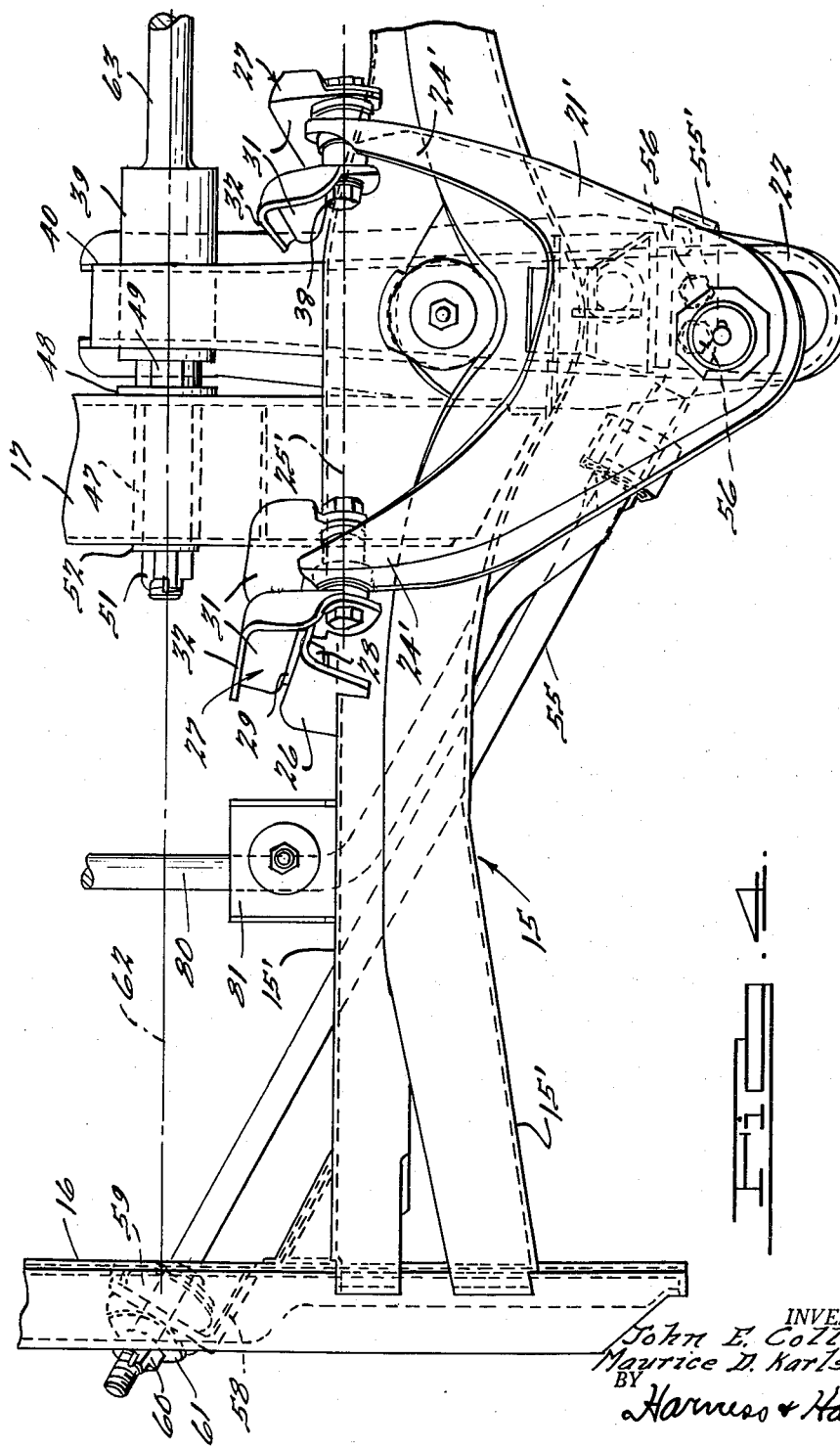

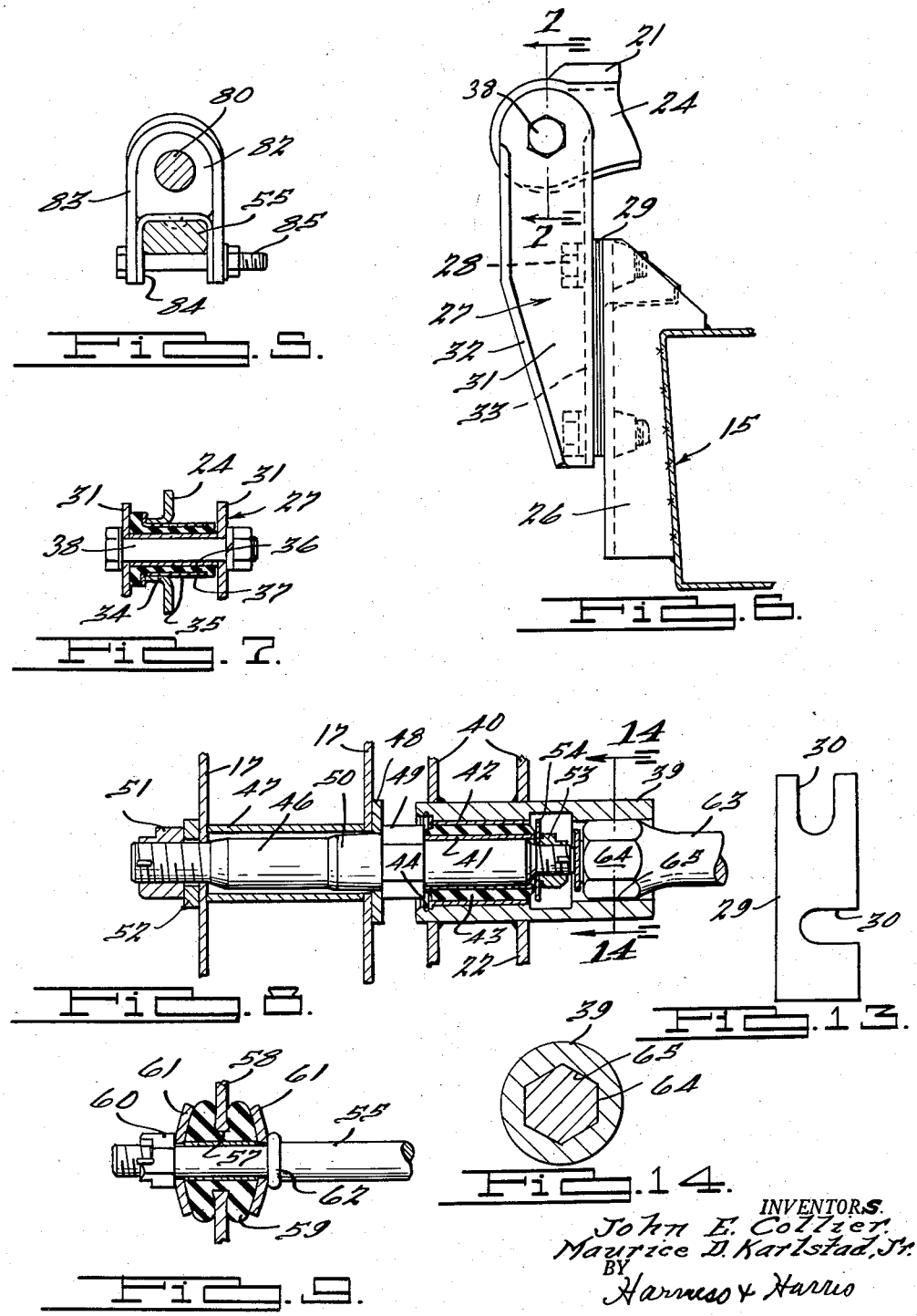

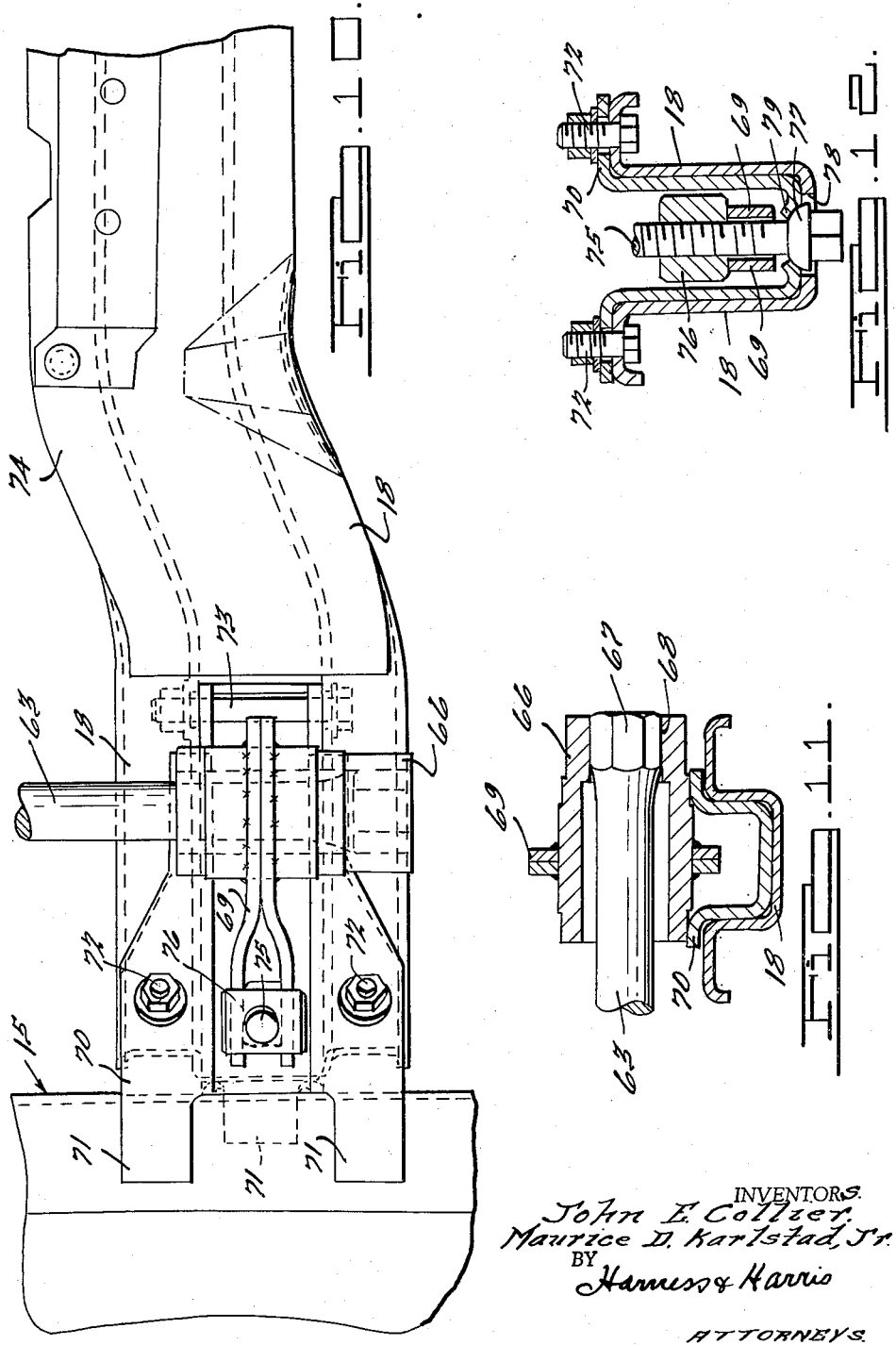

2,972,489

VEHICLE WHEEL SUSPENSION

John E. Collier, Detroit, and Maurice D. Karlstad, Jr., Centerline, Mich., assignors to Chrysler Corporation, Highland Park, Mich., a corporation of Delaware Filed June 18, 1957, Ser No. 666,293
15 Claims. (Cl. 280—124)

This invention relates to improvements in the independent suspension of a pair of oppositely disposed road wheels.

An object of the invention is to provide a suspension which resists the tendency of the vehicle to deflect or dip downwardly at one end and elevate at the other end upon braking deceleration when the vehicle is moving in a forward direction.

Another object of the invention is to provide a suspension which accommodates retreat of the suspended road wheel when the latter strikes a bump for example diving forward movement of the vehicle, thus minimizing fore and aft harshness of the suspension, and to further improve the suspension by the elimination of breakaway friction at articulate connections in the suspension.

A further object of the invention is the provision of a weight supporting spring in the form of a torsion bar, and a novel arrangement of the bar with respect to the associated wheel suspension and vehicle frame or equivalent support structure; to provide mechanism for adjustably torsionally loading the bar to insure uniform height at the front end of the vehicle; and to so arrange the bar and mechanism as to minimize interference thereof with associated structures.

More particularly the invention has for an object the use of rubber-like material at the articulated connections between movable components of the suspension and the support therefor, such material being internally stressd in accommodating relative movement at the articulated connections, thus eliminating breakaway friction and the necessity for lubrication at such connections. The rubber isolates the suspension and frame and permits limited retreat of the wheel thereby reducing fore and aft harshness.

In carrying out the invention each road wheel is supported for independent rising and falling movements by upper and lower linkages connected to the vehicle frame, or an equivalent support, for swinging movement about respective axes which, in plan, diverge longitudinally of the vehicle in the direction of the adjacent end thereof, thus resisting downward and upward deflection of the vehicle at the respective end portions thereof. As a further feature of the invention these axes are inclined longitudinally of the vehicle in a common direction but at respectively different degrees of inclination. This arrangement produces the anti-deflection effect and also acts in conjunction with the rubber on the aforesaid articulated connections to permit limited retreat of the road wheel, thereby minimizing fore and aft harshness on the suspension.

As a further feature of the invention the torsion bar spring is aligned with the frame pivot axis of the lower linkage, and a novel arrangement is employed to provide such frame pivot axis by a cantilever carried by a component of the frame. The arrangement of the pivot axes for the suspension linkages and the associated torsion spring bar makes possible substantial usable space in the engine compartment and avoids interference problems which would otherwise exist in today's low car silhouettes.

Other objects and advantages of the invention will be apparent from the following description taken in connection with the accompanying drawings, in which:

Fig. 1 is a fragmentary side elevational view illustrating a motor vehicle chassis embodying the invention;

Fig. 2 is a fragmentary side elevational view, partly in section, as viewed on the line 2—2 of Fig. 1;

Fig. 3 is a fragmentary top plan view of the structure shown in Fig. 1;

Fig. 4 is a view similar to Fig. 3 but illustrating a modification with respect to the disposition of the axis of pivot of the upper suspension linkage;

Fig. 5 is an elevational view, partly in section, taken on the line 5—5 of Fig. 1;

Fig. 6 is an elevational view, partly in section, as viewed on line 6—6 of Fig. 3;

Fig. 7 is a view taken on line 7—7 of Fig. 6;

Fig. 8 is a view, partly in section, taken as indicated by line 8—8 of Fig. 3;

Fig. 9 is a view, partly in section, taken on line 9—9 of Fig. 3;

Fig. 10 is a fragmentary plan view taken as indicated by line 10—10 of Fig. 2;

Fig. 11 is a view, mainly in section, taken on line 11—11 of Fig. 2;

Fig. 12 is a sectional view taken as indicated by line 12—12 of Fig. 2;

Fig. 13 is an elevational view of a typical shim used in the suspension; and

Fig. 14 is a sectional view taken on line 14—14 of Fig. 8.

Inasmuch as the suspension for the vehicle road wheel at either side of the vehicle and the related structure of the chassis are the same, the illustration and description of the invention are confined in the main to a typical wheel suspension and related chassis structure for the sake of brevity.

The chassis as shown includes a frame having laterally spaced side rails, one of which is shown at 15, extending longitudinally of the vehicle, and cross members, including member 16 at the front end of the frame, member 17 at the location of the attachment of the front wheel suspension to the frame, and member 18 which mounts the vehicle engine in addition to the other functions hereinafter set forth. Each side rail is formed by a pair of components 15' telescoped throughout a major portion of the rail length to define a box in cross-section as shown in Fig. 2, but such components diverge in the region of the front end portion of the rail as shown in Figs. 3 and 4. It will be understood that the invention can be embodied in a vehicle in which the equivalent functions of the chassis frame can be performed by structural components which are incorporated in and form a part of the vehicle body structure.

Each road wheel, not shown, is adapted to be rotatably mounted on a spindle 19 carried by an upright knuckle 20 and each knuckle is connected to the frame structure by an upper linkage 21 and a lower linkage 22, said linkages being commonly referred to as control arms in the type of suspension. The upper linkage 21 is preferably formed by a sheet metal stamping the body of which is connected to the upper end of the knuckle 20 by a ball and socket joint generally indicated by the numeral 23. Diverging arms 24, integral with the body, are pivotally connected to the adjacent side rail 15 for swinging movement relative thereto about an axis indicated by the line 25 in Fig. 3 in response to vertical displacement of the associated road wheel. Such pivotal axis for each upper linkage is arranged in non-parallel relationship with respect to the longitudinal central line of the vehicle and, as viewed in plan, these axes converge in the direction toward the front end of the vehicle. One advantage of the arrangement is to provide additional space for the engine compartment which is located adjacent to this mounting of the suspension linkages. When viewed in side elevation, each axis 25 is inclined in the direction toward the rear of the vehicle as shown in Fig. 1.

Referring to Fig. 4, the arms 24' of the upper linkage 21' are formed and arranged to dispose the axis 25' of the upper linkage in parallel with the longitudinal central line of the vehicle, each axis 25' when viewed in side elevation being inclined downwardly in the direction toward the rear of the vehicle. Otherwise the Fig. 3 and Fig. 4 embodiments are the same and corresponding parts are designated by corresponding numerals.

For pivotally mounting the arms 24 of each upper linkage to the frame, a support 26 for one arm is welded to the adjacent frame side rail 15 and a mounting bracket 27 for one arm is secured by spaced bolts 28 to its support 26, as more particularly shown in Fig. 6. The bracket 27 for the other arm is bolted directly to the frame side rail. Shims 29 are disposed between the bracket 27 and frame or support 26 in such number as to establish the desired wheel camber by shift of the linkage inwardly or outwardly with a corresponding inclination of the knuckle 20. The proper wheel castor can be had by using a greater or lesser number of shims at the respective arm mountings. In order to facilitate installing or removing a shim to effect the camber and castor adjustments, such shim may, as shown in Fig. 13, have slots 30 one intersecting an end periphery thereof which receives one bolt 28 and the other slot intersecting a side periphery which receives the other bolt 28. Thus, a shim can be swung into and out of assembly without removing the bracket 27 from its support.

Each mounting bracket 27 is generally channel-shaped, the side walls 31 thereof terminating in laterally directed flanges 32 and the web 33 thereof abuts the shims 29. The free end of each arm 24 has an opening bounded in the main by an annular flange 34, as shown in Fig. 7, for receiving a bushing which includes an outer sleeve 35, an inner sleeve 36, and a rubber body in the form of a spool 37 therebetween and under compression. One end of sleeve 35 is flanged to extend between the free end of the flange 34 and the adjacent relatively enlarged end of the rubber spool 37. The composite bushing has a press fit in the opening in the arm 24 and the bushing and arm 24 are connected to the bracket 27 by a pin in the form of a bolt 38 which extends through openings in the side walls 31 of the bracket 27. These side walls are drawn together by the bolt 38 to the extent permitted by the inner sleeve 36 which thus acts as a spacer and is normally held against rotation relative to bolt 38. Movement of the linkage is accommodated by internal stress of the rubber spool 37 and this action of the rubber avoids static friction which would otherwise exist during relative movement of the connected parts. Avoiding static friction in turn minimizes the harshness of the suspension during the so-called "boulevard" ride.

The lower linkage 22 is preferably a sheet metal stamping, channel-shaped in cross section, and a sleeve 39 extends through openings in the side walls 40 thereof and is fixed to the walls as by welding for movement with the linkage. A composite bushing is press fitted in the sleeve 39 and includes metallic inner and outer sleeves 41 and 42 and an intermediate rubber sleeve 43 under compression. A split ring 44 opposes axial movement of the bushing in one direction. The outer end of the linkage 22 is connected to the lower end of knuckle 20 by a ball and socket joint 45, as shown in Fig. 1.

Referring to Fig. 8, the inner end of the linkage 22 is mounted on a cantilever 46 carried by the frame cross member 17, the latter being channel-shaped in cross section and the side walls having registering openings receiving the cantilever. A spacing tube 47 is disposed between the walls and an apertured reinforcing plate 48 abuts and is welded to one of the cross member legs. The cantilever has a shoulder 49 which abuts the plate 48, the cantilever being tapered at 50 for wedging engagement with the wall bounding the opening in the plate 48. The threaded end portion of the cantilever is reduced and has a relatively close sliding fit with the wall bounding the opening in the adjacent cross member leg, the cantilever being otherwise free from engagement with the spacer 47. This fit and the above described wedging engagement stabilize the cantilever relative to the cross member and in final assembly a nut 51 is threaded on the cantilever against a washer 52.

With the sleeve 39 fixed to the lower linkage 22 and the composite bushing press fitted in the sleeve 39, the cantilever portion to the right of the shoulder 40, as viewed in Fig. 8, is projected through the bushing. One end of the inner bushing sleeve 41 abuts the shoulder 40 and a nut 53 is threaded on the adjacent end of the cantilever against a washer 54 which abuts the adjacent end of inner sleeve 41. The latter is held against rotation in response to swinging movement of linkage 22 and sleeve 39, such movement being accommodated by internal stress of the rubber of sleeve 43. The diameter of the washer 54 is not greater than the outer diameter of the composite bushing to permit assembly.

Each lower linkage 22 includes a strut 55, one end portion 55' of which extends transversely of the linkage channel member and is secured thereto at spaced locations by bolts 56. The end portion 55' also serves as a stop limiting steering movement of the adjacent road wheel. The main body of the strut extends diagonally forwardly and passes through an opening 57 in the web of a channel bracket 58 carried by the frame front cross member 16. The forward end portion of the strut is connected to this bracket by a body of rubber 59 which provides two pillows, one at either face of the bracket. A nut 60 cooperates with two discs 61, one at each of the opposite faces of the rubber body 59, and a shoulder 62 on the strut retains the parts in assembled relation, as more particularly shown in Fig. 9.

Each lower control linkage is thus composed of two main components, that is the load-carrying channel-shaped arm 22 and the strut 55 which move together in response to vertical deflection of the associated road wheel. During such movement the pivot point of the strut lies on the projected axis 62 of the lower linkage. The strut 55 stabilizes the suspension in fore and aft directions and the rubber body 59 in conjunction with the rubber in the pivotal connections of the linkages 21, 22 to the frame relieves the fore and aft harshness which would otherwise exist where such connections are rigid. Furthermore, use of the rubber at the pivotal connections isolates the suspension from the frame, eliminates the necessity for lubrication at these points, and eliminates breakaway friction common to rigid, metal pivots.

The weight supporting spring for each wheel suspension is a torsionally stressed bar 63 disposed longitudinally of the vehicle, the forward end portion of which extends into sleeve 39 and is held against rotation relative thereto by a plurality of cooperating flat faces 64 and 65 respectively on the end portion of the bar and the inner surface of sleeve 39. The bar 63 is thus alined with the axis of pivot of the lower linkage 22 relative to the frame. The bar 63 is adjustably anchored to the frame by extending its rear end portion into a sleeve 66 and this end portion of the bar is non-rotatably connected to sleeve 66 by a plurality of cooperating flat faces 67 and 68 respectively on the bar and on the inner surface of the sleeve. For torsionally loading the bar 63 by rotation of its rear end portion, the sleeve 66 has a crank arm 69 welded thereto, this arm having a bifurcated end portion as shown in Fig. 10.

The structure for supporting bar 63 and sleeve 66 and for rotating the crank arm 69 to torsionally load the bar is shown more particularly in Figs. 2, 10, 11, and 12. This structure includes a bracket 70 having upper and lower flanges 71 which embrace the adjacent side rail 15 and are welded thereto. The main body of the bracket 70 defines a channel opening upwardly and which decreases in depth from a maximum at the location shown at Fig. 12 to a minimum at the location shown by Fig. 11. The cross member 18 defines a channel, opening inwardly, into which the bracket 70 is nested as shown in Figs. 11 and 12. The side walls of these channel members have overlapping lateral flanges which are bolted together as shown at 72, and the side walls are also secured together by a transverse bolt 73. The open face of cross member 18 is closed by a plate 74.

For rotating the crank arm 69 to torsionally load the spring bar 63, a bolt 75 is in threaded engagement with a cylindrical nut 76 which straddles the bifurcated arms of the crank 69. The spherical head 77 of the bolt extends through an opening 78 in the web of cross member 18 and engages a spherical seat 79 in the web of the bracket 70, as shown in Fig. 12. The clearance of the head 77 in the opening 78 permits dropping of the cross member 18 by removal of bolts 72 and 73 without unloading the torsion bar spring 63. It will be understood that threading the bolt 75 in nut 76 will rotate the crank 69 in a counterclockwise direction, as viewed in Fig. 12, to torsionally load the spring bar 63 thereby to raise the suspension to the desired height.

The suspension may include a sway bar 80 having arms respectively secured to the strut 55 and a main body extending transversely of the vehicle and supported from the frame as at 81. A typical connection of sway bar arm and strut 55 is shown in Fig. 5, in which the bar 80 extends through a body of rubber 82 confined by inner and outer U-shaped brackets 83 and 84 which straddle the strut and are secured thereto by a bolt 85.

It will be noted that the pivotal axes, indicated at 25 and 62, of the upper and lower linkages on the frame are disposed in non-parallel relationship and diverge in a direction toward the front of the vehicle, as generally disclosed in U.S. Patents 2,245,809 and 2,354,219. Referring to Fig. 1, the axes 25 and 62 are inclined downwardly and rearwardly in the same direction, but at relatively different degrees of inclination, as shown by the relationship of these axes to a horizontal ground line. Inclination of the axis 62 of the lower linkage 22 is effected by inclining the cross member 17 as indicated by the line 86 and such inclination effects a corresponding inclination of the cantilever 46 which provides the pivotal support for the inner end of the lower linkage. The degree of inclination of the respective axes is illustrative of an embodiment to effect a given opposition to dive or downward deflection of the front end of the vehicle upon braking deceleration when the vehicle is moving in a forward direction. It will be understood that the respective degrees of inclination may, in the broad aspects of the invention, be varied including disposing the lower axis 62 in parallelism with the ground line, in which event the given opposition to dive would be determined by the degree of inclination of the axis 25, that is 17° to the horizontal to effect such given opposition. In any event, the frame axes would diverge in a forward direction as shown.

In contrast to the arrangement here of inclining the frame axes of the linkages downwardly and rearwardly of the vehicle, at respective different degrees, the above patents disclose an arrangement in which these axes are respectively inclined upwardly and downwardly longitudinally of the vehicle. The application arrangement permits a road wheel to retreat upon impact with a bump, for instance, during forward movement of the vehicle, and thus acting in conjunction with the rubber at the frame axes and at the forward end of struts 55, minimizes the fore and aft harshness of the suspension.

Furthermore, the application arrangement facilitates disposing the torsion bar spring 63 in coaxial relationship with the axis of a linkage and thus avoids imparting a bending force to the linkage as would result from connecting the bar 63 directly to a linkage. Preferably the spring 63 is aligned with the axis 62 of the lower linkage as this permits use of a bar shorter than would be possible where the bar is aligned with the axis 25 due to the lesser angularity of the lower linkage than the upper linkage. In applying a torsion spring bar in alignment with the axis 15 of Patent 2,245,809, for example, the rear end of the bar due to its elevation would present an interference problem with the vehicle body, particularly in view of the present tendency to lower the body. The arrangement of the axis 62 and bar 63 eliminates such interference problem, and also permits use of a suitable mechanism at the rear end of the bar for adjustably torsionally loading the latter without a material interference between this mechanism and the vehicle body.

We claim:

1. In a vehicle, a support structure, a cantilever carried by said support structure, an upright wheel carrying member adjacent one end of the vehicle, means connecting said member to said structure for rising and falling movement relative thereto including verticallly spaced linkages extending outwardly from said structure, means respectively connecting said linkages to said support structure for swinging movement relative thereto about vertically spaced axes each inclined downwardly relative to the horizontal in a direction toward the other end of the vehicle, the angle of inclination of the upper of said axes being greater than the angle of inclination of the lower of said axes whereby said axes converge in said direction when viewed in side elevation, the said means connecting the lower of said linkage to said support structure including a sleeve movable with said lower linkage and journalled on said cantilever, means forming an articulated connection between each said linkage and wheel carrying member, and a torsion rod spring arranged generally longitudinally of the vehicle having an end portion extending into said sleeve and fixed against rotation relative thereto, and means adjustably anchoring the other end portion of said spring rod to said support structure.

2. In a vehicle, a support structure, a cantilever carried by said support structure, an upright wheel carrying member adjacent one end of the vehicle, means connecting said member to said structure for rising and falling movement relative thereto including vertically spaced linkages extending outwardly from said structure, means respectively connecting said linkages to said support structure for swinging movement relative thereto about vertically spaced axes each inclined downwardly relative to the horizontal in a direcaion toward the other end of the vehicle, the angle of inclination of the upper of said axes being greater than the angle of inclination of the lower of said axes whereby said axes converage in said direction when viewed in side elevation, the said means connecting the lower of said linkages to said support structure including a sleeve movable with said lower linkage and journalled on said cantilever, means forming an articulated connection between each said linkage and said wheel carrying member, and a torsion rod spring arranged generally longitudinally of the vehicle having an end portion extending into said sleeve and fixed against rotation relative thereto, and means adjustably anchoring the other end portion of said spring rod to said support structure, the last mentioned means including a member having a bore non-rotatably receiving the said other end portion of the spring rod, a crank carried by said member, and means cooperating with said support structure and acting on said crank to rotate the latter thereby to torsionally load said spring rod.

3. In a vehicle, a support structure, an upright wheel carrying member adjacent one end of the vehicle, means connecting said wheel carrying member to said support structure for rising and falling movement relative thereto including vertically spaced linkages extending outward from said structure and connected thereto for swinging movement about vertically spaced axes converging, when viewed in side elevation, toward the other end of the vehicle, the connection between the lower of said linkages and said support structure including a cantilever carried by said support structure and a sleeve fixed to said lower linkage for movement therewith and telescoping said cantilever with radial clearance space therebetween, a bushing in said clearance space journalling said sleeve on said cantilever, a torsion bar spring disposed generally longitudinally of the vehicle having one end portion thereof extending into and non-rotatably connected to said sleeve, means cooperating with the other end portion of said bar and with said support structure operable to torsionally load said bar and to anchor the loaded bar to said support structure, and means connecting said linkages to said wheel carrying member.

4. In a vehicle, a support structure, an upright wheel carrying member adjacent one end of the vehicle, means connecting said wheel carrying member to said support structure for rising and falling movement relative thereto including vertically spaced linkages extending outward from said structure and connected thereto for swinging movement about vertically spaced axes converging, when viewed in side elevation, toward the other end of the vehicle, the connection between the lower of said linkages and said support structure including a cantilever carried by said support structure and a sleeve fixed to said lower linkage for movement therewith and telescoping said cantilever with radial clearance space therebetween, a bushing in said clearance space journalling said sleeve on said cantilever, said cantilever having a relatively radially enlarged portion defining an abutment for one end of said bushing, a torsion bar spring disposed generally longitudinally of the vehicle having one end portion thereof extending into and non-rotatably connected to said sleeve, means cooperating with the other end portion of said bar and with said support structure operable to torsionally load said bar and to anchor the loaded bar to said support structure, and means connecting said linkages to said wheel carrying member.

5. In a vehicle, a support structure, an upright wheel carrying member adjacent one end of the vehicle, means connecting said wheel carrying member to said support structure for rising and falling movement relative thereto including vertically spaced linkages extending outward from said structure and connected thereto for swinging movement about vertically spaced axes converging, when viewed in side elevation, toward the other end of the vehicle, the connection between the lower of said linkages and said support structure including a cantilever carried by said support structure and a sleeve fixed to said lower linkage for movement therewith and telescoping said cantilever with radial clearance space therebetween, a bushing in said clearance space journalling said sleeve on said cantilever, a torsion bar spring disposed generally longitudinally of the vehicle having one end portion thereof extending into and non-rotatably connected to said sleeve, means cooperating with the other end portion of said bar and with said support structure operable to torsionally load said bar and to anchor the loaded bar to said support structure, and means connecting said linkages to said wheel carrying member, the said torsionally loading and anchoring means including a member telescoping the torsion bar spring adjacent said other end portion thereof, said member and said bar having engaged polygonal surfaces cooperating to limit relative rotation between said member and bar spring, a crank carried by said member and operable when rotated to torsionally load said bar spring, and means cooperating with said support structure and acting on said crank to rotate the latter and retain the same in a rotated position.

6. In a vehicle having a support structure including a first component extending generally longitudinally of the vehicle and a second component secured to said first component and extending generally transversely of the vehicle, a wheel carrying member, upper and lower linkages connecting said wheel carrying member to said support structure for rising and falling movement relative thereto, said upper linkage including relatively spaced arm portions, means connecting each said arm portion to said support structure including a bracket carried by said first component, a pivot pin carried by said bracket and a rubber bushing journalling said arm portion on said pivot pin; means connecting the lower linkage to said support structure including a cantilever carried by said second structural component and a sleeve non-rotatably carried by said lower linkage and telescoping said cantilever, and a bushing including a body of rubber journalling said sleeve on said cantilever for swinging movement relative thereto; means connecting each of said linkages to said wheel carrying member for relative movement therebetween; and a torsion bar spring extending into said sleeve and rotatively fixed thereto, and means cooperating with said support structure and said bar for torsionally loading the latter.

7. In a motor vehicle including a support structure and a wheel carrying member, vertically spaced links extending between said member and said structure, means connecting each of said links to said support structure for swinging movement relative thereto about an axis, the connecting means for one of said links and said support structure including a cantilever fixedly carried by a component of said support structure and a sleeve fixed to said one link and telescoping said cantilever with radial clearance space therebetween, a bushing in said radial clearance space, a torsion bar spring having one end thereof anchored to said support structure and the other end extending into and non-rotatably connected to said sleeve, and means connecting the said links to said wheel carrying member.

8. In a motor vehicle including a support structure and a wheel carrying member, vertically spaced control arms extending between said member and said structure, means connecting each of said arms to said support structure for swinging movement relative thereto about an axis, the connecting means for one of said arms and said support structure including a cantilever fixedly carried by a component of said support structure and a sleeve fixed to said one arm and telescoping said cantilever with radial clearance space therebetween, a bushing in said radial clearance space, a torsion bar spring having one end thereof anchored to said support structure and the other end extending into and non-rotatably connected to said sleeve, and means connecting the said arms to said wheel carrying member, said cantilever having a relatively enlarged portion spacing said sleeve and said one arm relative to said support structure component in a direction lengthwise of said cantilever.

9. In a motor vehicle including a support structure and a wheel carrying member, vertically spaced central arms extending between said member and said structure, means connecting each of said arms to said support structure for swinging movement relative thereto about an axis, the connecting means for one of said arms and said support structure including a cantilever extending through a component of said support and having portions projecting oppositely therefrom, a sleeve secured to said one arm and telescoping one of said cantilever portions, a bushing journalling said sleeve on said one cantilever portion, said cantilever having a relatively enlarged part defining an abutment disposed between said component and said bushing, a nut threaded onto said one cantilever portion pressing said bushing against said abutment, and a nut threaded onto the other cantilever portion drawing said abutment against said component, and a torsionally active weight supporting spring bar having one end portion anchored to said support structure and the other end portion thereof extending into and non-rotatably connected to said sleeve.

10. In a vehicle including a frame structure, a pair of wheel carrying members adjacent one end of the vehicle and disposed one at either side of the frame structure, means connecting each of said wheel carrying members to said frame structure for independent vertical displacement of said wheel carrying members, each connecting means including upper and lower links extending outwardly from the frame and connected thereto for swinging movement about vertically spaced axes converging in elevation in a direction toward the other end of the vehicle, ball and socket joint respectively connecting said links to said wheel carrying member, a torsion spring bar anchored at one end to said lower link and extending toward said other end of the vehicle and anchored to said frame structure, a rod fixed to said lower link for movement therewith and extending therefrom toward said one end of the vehicle, and means including a body of rubber-like material connecting said rod to said frame for relative movement therebetween in response to swinging movement of said lower link.

11. In a motor vehicle including a support structure and oppositely disposed road wheel carriers, means including a linkage connecting each carrier to said support structure for independent vertical displacement of the carrier relative to the support structure, each linkage including an arm extending outwardly from and swingably connected to the support structure for movement about an axis extending longitudinally thereof, said arm having an articulate connection with its associated carrier, each linkage further including a strut fixed at one end portion thereof to the arm of such linkage and extending therefrom in a direction to intersect the projected axis of swing of the arm, means yieldably connecting said strut to said support structure at the intersection of said strut with said projected axis, for universal rocking movement, and an antisway member including a main body part extending generally transversely of and journaled on the vehicle and integral crank arms angled from the body part and respectively connected to said struts for conjoint movement therewith.

12. In a vehicle having a support structure including a first component extending generally longitudinally of the vehicle and a second component secured to said first component and extending generally transversely of the vehicle, a wheel carrying member, upper and lower linkages connecting said wheel carrying member to said support structure for rising and falling movement relative thereto, said upper linkage including relatively spaced arm portions, means connecting each said arm portion to said support structure including a bracket carried by said first component, a pivot pin carried by said bracket and a rubber bushing journalling said arm portion on said pivot pin; means connecting the lower linkage to said support structure including a cantiliver carried by said second structural component and a sleeve non-rotatably carried by said lower linkage and telescoping said cantilever, and a bushing including a body of rubber journalling said sleeve on said cantilever for swinging movement relative thereto; means connecting each of said linkages to said wheel carrying member for relative movement therebetween; and a torsion bar spring extending into said sleeve and fixed thereto to react against rising and falling movement of said wheel carrying member, and means cooperating with the first component of said support structure and said bar for adjusting the torsional loading of the latter.

13. In a vehicle having a support structure including a first component extending generally longitudinally of the vehicle and a second component secured to said first component and extending generally transversely of the vehicle, a wheel carrying member, upper and lower linkages connecting said wheel carrying member to said support structure for rising and falling movement relative thereto, said upper linkage including relatively spaced arm portions, means connecting each said arm portion to said support structure including a bracket carried by said first component, a pivot pin carried by said bracket and a rubber bushing journalling said arm portion on said pivot pin; means connecting the lower linkage to said support structure including a cantilever carried by said second structural component and a sleeve non-rotatably carried by said lower linkage and telescoping said cantilever, and a bushing including a body of rubber journalling said sleeve on said cantilever for swinging movement relative thereto; means connecting each of said linkages to said wheel carrying member for reiative movement therebetween; and a torsion bar spring extending into said sleeve and fixed thereto to react against rising and falling movement of said wheel carrying member, and a thrust rod extending longitudinally of said support structure anchored to said lower linkage and connected to said support structure by an articulated connection that accommodates rising and falling movement of said wheel carrying member.

14. In a motor vehicle including a support structure and oppositely disposed road wheel carriers, means connecting each carrier to said support structure for independent vertical displacement of the carrier relative to the support structure, said means including a control arm extending outwardly from and swingably connected to the support structure for oscillation about an axis extending longitudinally of the vehicle, said arm having an articulate connection with its associated carrier, said arm further including a strut fixed at one end portion thereof to the arm for movement therewith and extending therefrom in a direction to intersect the projected axis of oscillation of the arm, means connecting the other end of said strut to said support structure at the intersection of said strut with said projected axis for univeral pivoting movement with respect thereto and a torsion bar spring anchored to said control arm and said support at spaced points along its length and arranged to extend substantially coaxial with said axis of oscillation.

15. In a motor vehicle suspension as set forth in claim 14 where said control arm is swingably connected to said support by means of torsionally stressed resilient bushings.

References Cited in the file of this patent

UNITED STATES PATENTS

| | | |
|---|---|---|
| 2,245,809 | Olley | June 17, 1941 |
| 2,330,633 | Seyerle | Sept. 28, 1943 |
| 2,556,767 | McCann | June 12, 1951 |
| 2,596,922 | Thoms | May 13, 1952 |
| 2,607,609 | Allison | Aug. 19, 1952 |
| 2,736,570 | Crane | Feb. 28, 1956 |
| 2,815,084 | Fortgang et al. | Dec. 3, 1957 |
| 2,845,279 | Polhemus et al. | July 29, 1958 |
| 2,852,269 | Gaines | Sept. 16, 1958 |

FOREIGN PATENTS

| | | |
|---|---|---|
| 57,254 | France | Oct. 8, 1952 |

(1st Addition to No. 980,291)

UNITED STATES PATENT OFFICE

CERTIFICATION OF CORRECTION

Patent No. 2,972,489            February 21, 1961

John E. Collier et al.

It is hereby certified that error appears in the above numbered patent requiring correction and that the said Letters Patent should read as corrected below.

Column 1, line 28, for "breakway" read -- breakaway --; line 42, for "stressd" read -- stressed --; column 6, line 34, for "linkage" read -- linkages --; line 53, for "direcaion" read -- direction --; line 56, for "converage" read -- converge --; column 8, line 57, for "central" read -- control --.

Signed and sealed this 29th day of August 1961.

(SEAL)
Attest:

ERNEST W. SWIDER
Attesting Officer

DAVID L. LADD
Commissioner of Patents